United States Patent
Milton

(10) Patent No.: US 7,299,791 B2
(45) Date of Patent: Nov. 27, 2007

(54) PUMP SPACER/DAMPENING STRUCTURE FOR FUEL DELIVERY SYSTEM

(75) Inventor: Jeffery J. Milton, Lake Orion, MI (US)

(73) Assignee: Siemens VDO Automotive Corp., Auburn Hills, MI (US)

( * ) Notice: Subject to any disclaimer, the term of this patent is extended or adjusted under 35 U.S.C. 154(b) by 0 days.

(21) Appl. No.: 11/472,290

(22) Filed: Jun. 22, 2006

(65) Prior Publication Data

US 2006/0292017 A1   Dec. 28, 2006

Related U.S. Application Data

(60) Provisional application No. 60/693,159, filed on Jun. 23, 2005.

(51) Int. Cl.
*F02M 37/04*   (2006.01)
(52) U.S. Cl. ...................... 123/509; 123/510
(58) Field of Classification Search .............. 123/509, 123/510, 497, 495; 417/363, 364, 423.3
See application file for complete search history.

(56) References Cited

U.S. PATENT DOCUMENTS

| | | | | |
|---|---|---|---|---|
| 4,212,600 A | * | 7/1980 | Otto et al. ................. | 417/360 |
| 4,971,017 A | * | 11/1990 | Beakley et al. ............. | 123/510 |
| 5,392,750 A | * | 2/1995 | Laue et al. .................. | 123/509 |
| 6,457,458 B1 | * | 10/2002 | Frank et al. ................. | 123/509 |
| 6,672,288 B1 | * | 1/2004 | Schelhas et al. ............ | 123/509 |
| 6,675,778 B1 | * | 1/2004 | Kemper et al. ............. | 123/516 |
| 6,719,539 B1 | * | 4/2004 | Yoshioka .................... | 417/363 |
| 6,773,241 B2 | * | 8/2004 | Suzuki et al. ............ | 417/423.3 |
| 6,807,948 B2 | * | 10/2004 | Kanamaru et al. .......... | 123/495 |
| 2005/0045159 A1 | * | 3/2005 | Honda et al. ............... | 123/509 |

* cited by examiner

*Primary Examiner*—Carl S. Miller

(57) ABSTRACT

A fuel delivery system includes a filter 19 for filtering fuel. The filter 19 has an internal wall 20 defining a pocket 14. A fuel pump 12 is provided in the pocket 14 for pumping filtered fuel to an engine. A pump spacer structure 10 surrounds at least a portion of the fuel pump and positions the fuel pump within the pocket The pump spacer structure 10 has a portion 18 that engages the internal wall 20 of the filter 19. Dampening structure 22 is provided between the pump spacer structure 10 to dampen vibration generated by the fuel pump.

11 Claims, 1 Drawing Sheet

PUMP SPACER/DAMPENING STRUCTURE FOR FUEL DELIVERY SYSTEM

This application is based on U.S. Provisional Application No. 60/693,159, filed on Jun. 23, 2005 and claims the benefit of thereof for priority purposes.

FIELD OF THE INVENTION

This invention relates to fuel delivery systems for automotive applications and, more particularly, to a pump spacer/dampener for positioning and dampening a fuel pump inside of a filter/flange assembly.

BACKGROUND OF THE INVENTION

In certain fuel delivery systems, a fuel pump is provided in a pocket defined by a fuel filter or flange/filter assembly. In these arrangements there is a need to position the fuel pump within the pocket and to dampen vibration of a fuel pump. There are also situations when wires need to be provided past a fuel pump down to a level sender or other type of sensor.

Thus, there is a need to provide a pump spacer/dampening structure to position the fuel pump, dampen vibrations of the fuel pump, and permit wires to extend past the fuel pump.

SUMMARY OF THE INVENTION

An object of the invention is to fulfill the need referred to above. In accordance with the principles of the present invention, this objective is achieved by providing a fuel delivery system including a filter for filtering fuel. The filter has an internal wall defining a pocket. A fuel pump is provided in the pocket for pumping filtered fuel to an engine. A pump spacer structure surrounds at least a portion of the fuel pump and positions the fuel pump within the pocket. The pump spacer structure has a portion that engages the internal wall of the filter. Dampening structure is provided between the pump spacer structure and the fuel pump. The depending structure is constructed and arranged to dampen vibration generated by the fuel pump.

In accordance with another aspect of the invention, a method is provided for positioning a fuel pump with respect to a filter and for dampening vibration of the fuel pump. The method provides a filter for filtering fuel. The filter has an internal wall defining a pocket. A fuel pump is placed in the pocket for pumping filtered fuel to an engine. At least a portion of the fuel pump is surrounded with a pump spacer structure thereby positioning the fuel pump within the pocket. A dampening structure is provided between the pump spacer structure and the fuel pump to dampen vibration generated by the fuel pump.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing, in which.

DETAILED DESCRIPTION OF THE EXEMPLARY EMBODIMENT

Figure 1:
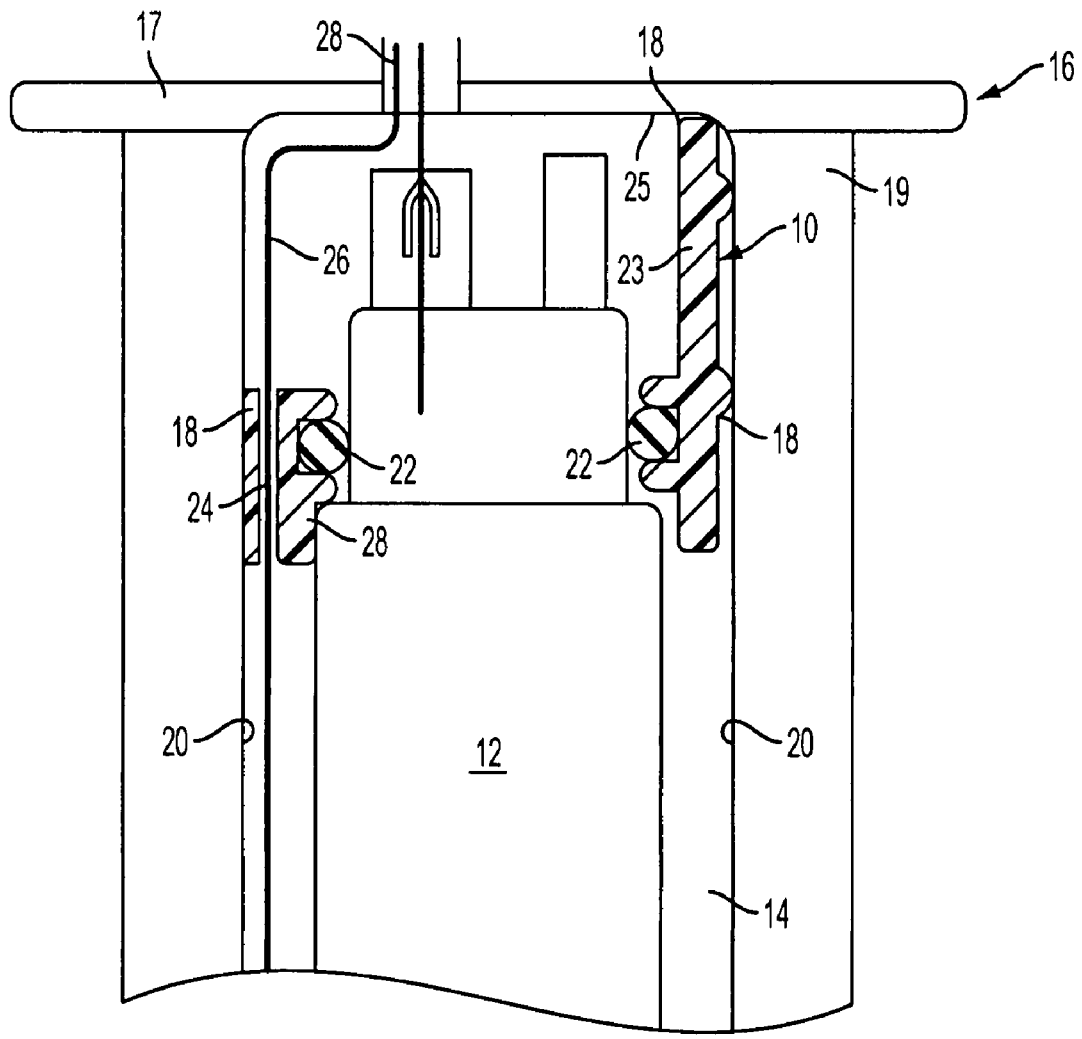
FIG. 1 is a schematic view of a pump spacer structure disposed about a fuel pump in accordance with the principles of the invention.

With reference to FIG. 1, a pump spacer structure is shown, generally indicated at 10, in accordance with the principles of the invention. A fuel pump 12 is provided in a pocket 14 defined by an internal wall 20 of a conventional flange/filter assembly, generally indicated at 16. In the embodiment, the flange/filter assembly 16 combines the conventional fuel filter 19 and mounting flange 17 into one structure. It can be appreciated that the filter 19 can also be separate from the flange 17 but coupled thereto.

The pump spacer structure 10 is a preferably composed of plastic and is a generally annular structure surrounding at least a portion of the pump 12. The pump spacer structure 10 has portions 18 that engage the internal wall 20 of the filter 19 of the flange/filter assembly 16. The pump spacer structure 10 includes a generally U-shaped flange 28 that is constructed and arranged to capture an elastomer member such as an O-ring 22 so as to dampen vibration generated by the fuel pump 12. Thus, the elastomer member or O-ring 22 defines dampening structure. The bottom of the flange 28 can engage a portion of the fuel pump 12 to control an insertion depth of the pump 12 into the pocket 14.

An wall 23 of the pump spacer structure 10 extends from the flange 28 and contacts the underside of the flange 17 to ensure proper positioning of the O-ring 22 with respect to the pump 12. In addition, the pump spacer structure 10 defines a channel or passageway 24 therein to permit wire(s) 26 to pass by the pump 12 and extend to sensors (not shown) near a bottom of a fuel tank (not shown). The other end 28 of the wire(s) 26 extends out of the flange/filter assembly 16.

Thus, the pump spacer structure 10 positions the fuel pump 12 inside of the pocket 14 and permits wires to extend past the fuel pump 12 to sensors. The O-ring 22 provides noise and vibration dampening of the fuel pump 12.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fuel delivery system comprising:
a filter for filtering fuel, the filter having an internal wall defining a pocket,
a fuel pump in the pocket for pumping filtered fuel to an engine,
a pump spacer structure surrounding at least a portion of the fuel pump and positioning the fuel pump within the pocket, the pump spacer structure having a portion engaging the internal wall of the filter, and
dampening structure, between the pump spacer structure and the fuel pump, constructed and arranged to dampen vibration generated by the fuel pump,
wherein the pump spacer structure defines capturing structure to capture the dampening structure so as to remain between the fuel pump and the pump spacer structure, and
wherein the capturing structure is a generally U-shaped flange and a bottom of the flange is constructed and arranged to engage a portion of the fuel pump to control an insertion depth of the fuel pump into the pocket.

2. The system of claim 1, wherein the dampening structure is an elastomer member.

3. A fuel delivery system comprising:
a filter for filtering fuel, the filter having an internal wall defining a pocket,
a fuel pump in the pocket for pumping filtered fuel to an engine,
a pump spacer structure surrounding at least a portion of the fuel pump and positioning the fuel pump within the pocket, the pump spacer structure having a portion engaging the internal wall of the filter, and
dampening structure, between the pump spacer structure and the fuel pump, constructed and arranged to dampen vibration generated by the fuel pump,
wherein the capturing structure is a generally U-shaped flange and wherein the dampening structure is an elastomer member, and
wherein the elastomer member is an O-ring.

4. A fuel delivery system comprising:
a filter for filtering fuel, the filter having an internal wall defining a pocket,
a fuel pump in the pocket for pumping filtered fuel to an engine,
a pump spacer structure surrounding at least a portion of the fuel pump and positioning the fuel pump within the pocket, the pump spacer structure having a portion engaging the internal wall of the filter, and
dampening structure, between the pump spacer structure and the fuel pump, constructed and arranged to dampen vibration generated by the fuel pump,
wherein the pump spacer structure defines capturing structure to capture the dampening structure so as to remain between the fuel pump and the pump spacer structure, and
wherein a flange is associated with the filter at an end of the filter, the pump spacer structure includes a wall extending from the capturing structure to contact an underside of the flange so as to position the dampening structure with respect to the fuel pump.

5. The system of claim 4, wherein the pump spacer structure is of plastic material and the dampening structure is an elastomer member.

6. A fuel delivery system comprising:
a filter for filtering fuel, the filter having an internal wall defining a pocket,
a fuel pump in the pocket for pumping filtered fuel to an engine,
a pump spacer structure surrounding at least a portion of the fuel pump and positioning the fuel pump within the pocket, the pump spacer structure having a portion engaging the internal wall of the filter, and
means, between the pump spacer structure and the fuel pump, for dampening vibration generated by the fuel pump,
wherein the pump spacer structure defines capturing structure to capture the means for dampening so as to remain between the fuel pump and the pump spacer structure and wherein the capturing structure is a generally U-shaped flange, and
wherein a bottom of the flange is constructed and arranged to engage a portion of the fuel pump to control an insertion depth of the fuel pump into the pocket.

7. The system of claim 6, wherein the means for dampening is an elastomer member.

8. A fuel delivery system comprising:
a filter for filtering fuel, the filter having an internal wall defining a pocket;
a fuel pump in the pocket for pumping filtered fuel to an engine,
a pump spacer structure surrounding at least a portion of the fuel pump and positioning the fuel pump within the pocket, the pump spacer structure having a portion engaging the internal wall of the filter, and
means, between the pump spacer structure and the fuel pump, for dampening vibration generated by the fuel pump,
wherein the pump spacer structure defines capturing structure to capture the means for dampening so as to remain between the fuel pump and the pump spacer structure, and
wherein a flange is associated with the filter at an end of the filter, the pump spacer structure includes a wall extending from the capturing structure to contact an underside of the flange so as to position the means for dampening with respect to the fuel pump.

9. The system of claim 8, wherein the pump spacer structure is of plastic material and the means for dampening is an elastomer member.

10. A method of positioning a fuel pump with respect to a filter and dampening vibration of the fuel pump, the method including:
providing a filter for filtering fuel, the filter having an internal wall defining a pocket,
placing a fuel pump in the pocket for pumping filtered fuel to an engine,
surrounding at least a portion of the fuel pump with a pump spacer structure thereby positioning the fuel pump within the pocket, and
providing a dampening structure between the pump spacer structure and the fuel pump to dampen vibration generated by the fuel pump,
wherein the step of providing a dampening structure includes providing an O-ring.

11. The method of claim 10, wherein the pump spacer structure defines a channel therein, the method including passing a wire through the channel.

* * * * *